US005925875A

United States Patent [19]
Frey

[11] Patent Number: 5,925,875
[45] Date of Patent: Jul. 20, 1999

[54] APPARATUS AND METHOD FOR COMPENSATING FOR FIXED PATTERN NOISE IN PLANAR ARRAYS

[75] Inventor: Robert D. Frey, Bolton, Mass.

[73] Assignee: Lockheed Martin IR Imaging Systems, Lexington, Mass.

[21] Appl. No.: 08/844,177

[22] Filed: Apr. 18, 1997

Related U.S. Application Data

[60] Provisional application No. 60/017,345, Apr. 26, 1996.
[51] Int. Cl.$^6$ ................................................ H01L 27/00
[52] U.S. Cl. ........................................ 250/208.1; 250/332
[58] Field of Search .............................. 250/208.1, 332, 250/334, 347; 358/443, 448, 447; 382/103, 260, 270, 275

[56] References Cited

U.S. PATENT DOCUMENTS

| | | | |
|---|---|---|---|
| 4,298,887 | 11/1981 | Rode | 358/113 |
| 4,675,532 | 6/1987 | Carson | 250/578 |
| 4,806,761 | 2/1989 | Carson et al. | 250/332 |
| 4,975,864 | 12/1990 | Sendall et al. | 364/571.01 |
| 5,276,319 | 1/1994 | Hepfer et al. | 250/208.1 |
| 5,465,080 | 11/1995 | Liddiard et al. | 340/567 |
| 5,514,865 | 5/1996 | O'Neil | 250/208.1 |
| 5,563,405 | 10/1996 | Woolaway, II et al. | 250/208.1 |
| 5,717,208 | 2/1998 | Woolaway, II | 250/332 |
| 5,729,285 | 3/1998 | Peterson et al. | 348/162 |
| 5,789,622 | 8/1998 | Quon et al. | 364/571.02 |
| 5,838,813 | 11/1998 | Kancler et al. | 382/103 |

FOREIGN PATENT DOCUMENTS

| | | |
|---|---|---|
| 0600742A | 6/1994 | WIPO . |
| 0653882A | 5/1995 | WIPO . |

OTHER PUBLICATIONS

Scribner, D.A., et al. (1990), "Nonuniformity Correction For Staring IR Focal Plan Arrays Using Scene–Based Techniques", *Spie*, vol. 1308 224–233.

Umomori, K. et al. (1992), "Electronic Image Stabilization System For Video Cameras and VCRs", *SMPTE Journal* vol. 101 No. 2 pp. 66–75.

Gillette, J.C. et al. (1995), "Aliasing Reduction In Staring Infrared Imagers Utilizing Subpixel Techniques", *Optical Engineering* vol. 34 No. 11 pp. 3130–3137.

Woolfson, M.G. (1992), "Electronic LOS Jitter Compensation for Staring Sensor", *SPIE*, vol. 1762, pp. 317–326.

Ideker, T., "Offset Correction Techniques for Imaging Sensors Using Random Dither Information", Theses submitted to M.I.T. in Jun., 1995.

O'Neil, W. et al., "Experimental Performance of a Dither–Scanned InSb Array", *Proc. IRIS Passive Sensors*, vol. 1 (1993).

*Primary Examiner*—Edward P. Westin
*Assistant Examiner*—Thanh X. Luu
*Attorney, Agent, or Firm*—Lahive & Cockfield, LLP

[57] ABSTRACT

An apparatus and method for reducing fixed pattern noise in a planar array that includes an array of image responsive detectors, a dithering mechanism for dithering an observed image relative to the array, a high pass filter, and an image restorer. The fixed pattern noise in an observed image is reduced by dithering the observed image across a plurality of detectors forming a planar array, filtering the detector responses with the high pass filter, and passing the filtered signals through the image restorer. A correcting element can be used to iteratively update the fixed pattern noise estimate. In addition, a voter or a frame averager can be included to reduce errors that might adversely effect the fixed pattern noise estimate.

46 Claims, 7 Drawing Sheets

APPARATUS AND METHOD FOR COMPENSATING FOR FIXED PATTERN NOISE IN PLANAR ARRAYS

RELATED APPLICATIONS

The current application is a continuation-in-part of and incorporates by reference the commonly-owned, co-pending United States Provisional Application, 60/017,345, filed on Apr. 26, 1996.

BACKGROUND OF THE INVENTION

This invention relates generally to arrays of image detectors and more particularly to the use of a dithering device to correct for differences in the responses of the individual image detectors forming the array.

An array of image detectors is typically composed of a large number of individual semiconductor detectors. Each of these detectors generates an electrical response upon exposure to electromagnetic radiation, such as infrared radiation. However, because of manufacturing constraints and environmental conditions, the detectors fail to have identical operating characteristics. That is, substantially similar levels of infrared radiation at two different detectors can generate different responses at each of the detectors.

To the extent that two detectors generate different electrical responses upon exposure to the same level of infrared radiation, we say that the detectors display "spatial non-uniformity". Spatial non-uniformity between detectors is caused by fixed pattern noise that includes individual detector offsets, residual gain error in the detectors, fixed pattern electronic noise, and non-dithered optical structure in the detectors field of view. Pixel offset errors in a detector can be modeled by adding a fixed DC value to each detector's ideal response, and pixel gain errors in a detector can be modeled by scaling each detector's ideal response.

One approach for correcting fixed pattern noise errors employs factory calibration of the detector array. Factory calibration involves exposing the array to a uniform source and tabulating the response of each detector in the array. The tabulated entries consist of gain and offset corrections for each detector in the array. The entries in the table can be applied against corresponding detectors to generate a corrected image. The factory calibration solution, however, suffers from multiple drawbacks. First, the pixel offset errors may not be linearly dependent, rather they may have non-linear temperature variations. Thus, factory calibration must take place over a broad range of temperatures to perform effectively. Second, this solution cannot correct for short-term temporal variations in pixel offset error that occur during operation of the array. For instance, variations in temperature of the detector array can create significant offset variations over time. Finally, this method requires recalibration to correct for long-term unpredictable changes in pixel offset errors that occur as the array components age.

An alternative approach eliminates the disadvantages associated with factory calibration by calibrating the focal plane array while it is in use. This is done by placing a rotating plate in front of the detector array, such that the array is alternately exposed to the image under observation and to a signal of known intensity. The fixed pattern noise is removed by subtracting a detector's response to the known signal from the detector's response to the observed image.

This solution has two drawbacks. First, by requiring a means for alternately exposing the array to the observed image and to a signal of known intensity, this solution requires additional complex mechanical or optical elements. Second, by requiring that the focal plane array spend time viewing a signal of known intensity instead of the scene under observation, this solution inevitably degrades the array's ability to track fast moving objects and reduces the potential signal to noise ratio of the sensor output.

O'Neil, in U.S. Pat. No. 5,514,865, discloses another approach for correcting spatial non-uniformities in a detector array. The O'Neil system employs a dithering system that spatially dithers the observed image across the detector array to correct the gain and offset errors in the array of detectors. The detector array line of sight is moved between consecutive image frames according to a predetermined pattern. This dithering of the array's line of sight causes different detectors to image the same location in the scene during different image frames, and causes two adjacent detectors to scan between the same two points in the scene during a cycle of the predetermined dither pattern. Theoretically, if two ideal detectors view the same part of an image then the two ideal detectors generate the same response to that part of the image. Differences existing in the response of two detectors viewing the same part of an image can accordingly be characterized as error in the detector response.

The O'Neil system calculates the detector error separately as a gain error and an offset error. The gain error is calculated by analyzing variations in gain from detector to detector in the array. During the dither pattern, two or more detectors will traverse the same path between the same two points in the scene. The difference in intensity between these two points is referred to as the scan gradient. Gain corrections are determined from the difference in the scan gradients of these two common points of the scene scanned by different detectors.

The offset error is calculated from variations in offset from detector to detector in the array. During the tracing of the dither pattern, a plurality of detectors will image the same point of the scene. The intensity sensed by these detectors should be the same. Thus, offset corrections are determined by measuring the difference in intensity of a point sensed by two or more different detectors.

The O'Neil system is understood to use average signal intensities to determine detector offset values, and to use average signal gradients to determine gain values. This system, however, appears to have difficulty with low frequency variations in offsets across the detector array. In addition, the O'Neil technique is very sensitive to the accuracy of the spatial movement of the dithering mechanism. This method also encounters difficulties when one or more of the detectors in a dithering cycle is so defective that it generates a signal of dubious reliability. The defective detector, when incorporated into the average detector response, can skew the average detector response of those detectors lying in the dithering cycle.

Accordingly, one object of the present invention is to provide an apparatus and method for correcting fixed pattern noise errors, both globally and locally, in a planar array of detectors.

This and other objects will be apparent from the following description.

SUMMARY OF THE INVENTION

The present invention is directed to a system that satisfies the need for reliably correcting fixed pattern noise errors in focal plane arrays. An apparatus having the properties of this invention includes a plurality of image detectors forming an array, a dithering element for spatially moving an observed image relative to the array, a temporal high pass filter having a non-zero DC response, and an image restoration element capable of restoring an observed image with reduced fixed pattern noise from the dithered and high-pass filtered image.

The invention reduces fixed pattern noise errors by exploiting the current understanding regarding the effects of dithering an observed image across a planar array of detectors. When the dithering element dithers the observed image across the array each of the detectors produces an image signal having an observed image component and a fixed pattern noise component. Because of the dithering motion, the observed image component spatially varies in a manner that causes each detector to output a temporally varying signal corresponding to the observed image. In comparison, the fixed pattern noise component of each detector does not spatially vary during the dithering cycle, thereby causing the detectors to output a relatively constant temporal signal corresponding to the fixed pattern noise.

The temporal high pass filter receives the image signals from the detectors, and generates a set of filtered image signals having an attenuated low frequency component. The high pass filter effectively passes through the observed image component of the image signals and blocks, or filters out, the fixed pattern noise component of the image signals. The image restoration element then forms a reconstructed image signal based on the filtered image signals.

One aspect of the invention provides for a correcting element that iteratively reduces the fixed pattern noise component in the image signals. The correcting element iteratively processes the current reconstructed image signal, an old noise signal representing previously determined fixed pattern noise, and a reference image signal corresponding to an image signal adjusted for pixel gain error; in order to form a new noise correction signal representing a more accurate estimate of the fixed pattern noise. The correction element can include a differencing element that forms an offset update signal equal to the difference between the reconstructed image signal and the reference image signal, and an update element that generates the new noise correction signal by summing the offset update signal and the old noise signal. The new noise correction signal is used to iteratively offset the fixed pattern noise in subsequent image signals. The iterative calculation of the fixed pattern noise quickly converges to an extremely accurate determination of the fixed pattern noise.

The correcting element can also include an optional offset estimate gain circuit for modifying the offset update signal. The gain circuit reduces temporal noise levels that might otherwise pass through the correcting element.

Another aspect of the invention provides a means for deriving the image restoration filter when, because of imprecision in driving the dithering mechanism, the dithering cycle is not known with precision. This aspect includes a means for measuring scene motion between image frames by shifting one image frame relative to the other and computing the correlation between the two frames for each such shift. The shift resulting in the largest correlation substantially corresponds to the scene motion during the interval between the two image frames.

Other features of the invention include a voter and a frame averager that each individually increase the accuracy of the system. The voter reduces errors in the system by refraining from processing every scan of the detector array. The frame averager reduces temporal noise error in the system by averaging signals based upon the output of detector in the array.

In another aspect, the invention includes a restoration element that convolves the filtered image signal with an inverse kernel to generate the reconstructed image signal. The restoration element can form the inverse kernel as a function of the dither cycle being used and as a function of the response of the high pass filter.

These and other features, aspects, and advantages of the present invention will be better understood with reference to the following description, the appended claims, and the accompanying drawings.

DETAILED DESCRIPTION OF THE INVENTION

Figure 1:
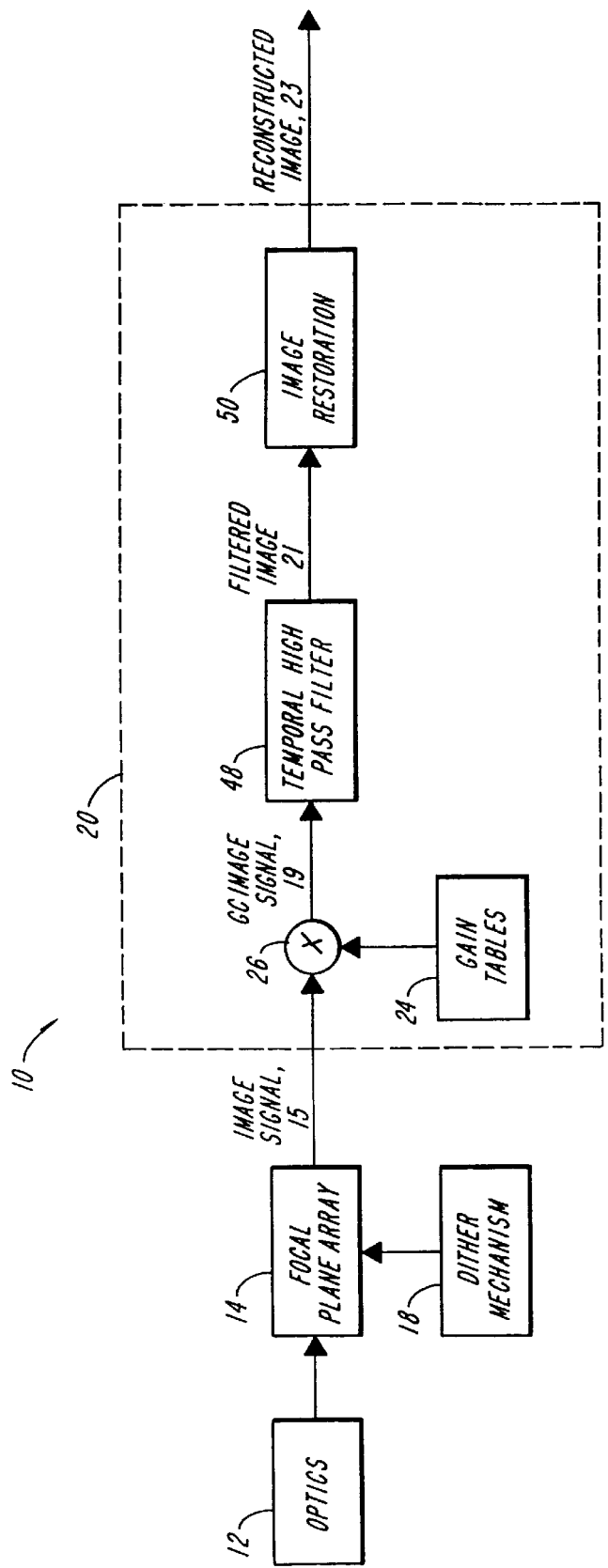
FIG. 1 shows a general block diagram disclosing the active offset compensation system of the invention.

FIG. 1 is a general block diagram disclosing the active offset compensation system 10 of the invention. The system includes optics 12, a focal plane array 14 comprised of individual detectors, an image dither mechanism 18, and a signal processor 20. The signal processor 20 can include a gain table 24, a first multiplier 26, a temporal high pass filter 48, and an image restorer 50.

The optics 12 focus an observed image from an instantaneous field of view (FOV) upon the focal plane array 14 located at the focal point of the optics 12. A portion of light from the entire FOV falls upon each individual detector element of the focal plane array 14. Each individual detector of the focal plane array 14 converts impinging photons into an electrical image signal 15. In particular, each individual detector element generates an image signal representative of a pixel of the observed image found in the instantaneous FOV. In a modem imaging system, the focal plane array 14 is a two-dimensional array of detector elements that respond to electromagnetic radiation. Preferably, each of the detector elements in the array 14 is sensitive to infrared radiation.

The individual detectors in the array are formed using techniques commonly known in the prior art. For example, visible light detectors may be silicon photodiodes connected to a charge-coupled device, and infrared detectors may be diodes formed of platinum silicide, indium anteminide, or mercury cadmium telluride. The size of the focal plane array 14 varies depending upon the application and the form of electromagnetic radiation that the array is tuned to sense. For instance, arrays for detecting infrared light have a number of detectors in the range of 64×64 to 640×640, while array for detecting visible light can have a number of detectors in the range of 64×64 to 2000×2000.

Concurrent with focusing the image onto the focal plane array 14, an image dither mechanism 18 dithers the observed image across the detectors in the focal plane array 14. Dither is the intentional motion of the observed image with respect to the sensing array. The dither mechanism 18 can either scan the observed image relative to the focal plane array, or the dither mechanism can scan the focal plane array relative to the observed image. Either form of dithering is controlled in such a way as to provide a repeatable and predictable trajectory of the observed image on the focal plane array. Given that the observed image is moving about a predictable path, an algorithm may then be employed in the signal processor 20 to separate the observed image from the fixed pattern noise.

Examples of dithering mechanisms include a motorized gimbal and a steerable mirror. The motorized gimbal can be used to change the angular position of the focal plane array 14 relative to the observed image. Alternatively, a steerable mirror can be used to move the line of sight of the observed image relative to the focal plane array. The steerable mirror is typically either a galvo mirror or a piezoelectric actuated mirror.

The dithering motion provides a mechanism for separating the desired image from the fixed pattern noise in the image signal 15. In general, many different dither patterns are acceptable. Selection of the dither pattern depends on the performance objectives of the system 10. A large dither pattern consisting of many pixels tends to mitigate non-responsive or dead pixels in the focal plane array 14. However, because of the time required to complete the large dither pattern, a penalty is paid in terms of maximum rate of motion of the observed image itself and a loss in performance at image edges. In comparison, small dither patterns reduce computational complexity and power requirements for the dithering mechanisms while simultaneously increasing the array's field-of-view. In order to maximize acceptable object space motion, a three point scan is preferable. This type of scan has advantages in computational complexity, field-of-view, and mitigation of dead pixels.

The image signals 15 output from the focal plane array 14 contains unwanted temporal noise and fixed pattern noise components added by the focal plane array 14. Temporal noise falls into two classes: white noise which is uniform across all frequencies, and colored noise which is not. White noise typically arises from the random thermal motion of electrons in the material comprising the detector ("thermal" or "Johnson" noise), and from charge carriers randomly crossing the potential barrier of photodiodes functioning as detectors. The major component of colored noise in infrared detectors is "1/f" or "flicker" noise which decreases with increasing frequency.

The image signals 15 generated by each detector comprising the focal plane array 14 are sampled in time to generate a sequence of frames, each containing a snapshot of the moving image. These frames are then passed to the signal processor 20 for removal of the fixed pattern noise components. With further reference to FIG. 1, the signal processor 20 includes the factory preset gain table 24, the first multiplier 26, the temporal high pass filter 48, and the image restorer 50.

The Gain Table 24 stores and retrieves gain adjustments for the system 10. Typically, these gain adjustments are determined in the factory and stored in tabular format in the factory. The gain table preferably includes an individual gain adjustment associated with each detector in the focal plane array 14. The first multiplier 26 is a device for generating an output signal representative of the multiplication of two input signals.

In operation, the first multiplier 26 receives as input the image signal 15 from the focal plane array 14 and receives as input a gain adjustment signal 17 from the gain table 24. The first multiplier 26 generates a GC (Gain Corrected) image signal 19 equal to the product of the gain adjustment signal 17 and the image signal 15. The GC image signal is a gain corrected version of the input image signal.

The temporal high pass filter 48 receives as input the GC image signal 19 and generates a filtered image signal 21 in response thereto. The temporal high pass filter reduces the low frequency components of the GC image signal 19. The filter 48 has separate and distinct effects on the fixed pattern noise and on the observed image contained within the GC image signal 19. The fixed pattern noise component in the output signal of the filter 48 is a scaled reduction of the fixed pattern noise component in the input signal to the filter 48. However, the observed image component in the output signal of the filter 48 is distorted in a predictable manner that allows restoration of the observed image component with a reduced fixed pattern noise component. The observed image component passes through the high pass filter 48 without any substantial loss of information content.

Spatial variations in the observed image result in temporal variations in the focal plane array output with image dither, and are therefore passed through the temporal high pass filter 48. Note, however, that regions in the observed image which have little spatial variation over the spatial extent of the dither sequence will be significantly reduced as they will cause minimal temporal variation in the detector outputs processed through the high pass filter 48. The observed image is effectively spatially high passed while the fixed pattern noise is reduced by the filter.

In accordance with a further aspect of the invention, the temporal high pass filter 48 has a non-zero DC response. High pass filters with a zero DC response may prove the most effective in rapidly removing fixed pattern noise, but high pass filters of this type have other side effects. For instance, a high pass filter with a zero DC response "washes out" pixels in the internal portion of the observed image. The internal portion of the object, having a relatively constant optical illumination, appears to high pass filters as constant DC components and, as such, are removed from the filtered image signal 21. Therefore, when the image is displayed, the central region of the object suffers from low resolution and the output of the high pass filter more closely resembles an edge detector than an object imager. Accordingly, to overcome these side effects, this aspect of the invention provides for a high pass filter having a non-zero DC response. The non-zero DC response reduces the fixed pattern noise component in the GC Image Signal 19.

The Image Restorer 50 receives the filtered image signal 21 as input and generates a reconstructed image signal 23 as output. In accordance with one aspect of the invention, the image restorer 50 is a data processor that performs a shift and time-delay-integration (hereinafter "TDI") step on the filtered image signal 21. This shift is basically a pixel registration step which matches the pixels between consecutive frames so that corresponding image points overlap. Once this correspondence exists, the process uses TDI to time-average the signals over several frames.

In accordance with an alternative aspect of the system, the image restorer 50 is a data processor that convolves the filtered image signal 21 with an inverse kernel representing the spatial inverse of the system. This aspect of the invention does not operate effectively with a high pass filter 48 having a zero DC response because the spatial inverse of a system having a zero DC response is not realizable.

Further in accordance with this aspect of the invention, the image restorer 50 typically has a priori knowledge of the response of the temporal high pass filter 48 and of either the dither pattern used by the dither mechanism 18 or measurements of the scene motion from which the dither pattern can be derived. Based on this a priori knowledge, the image restorer 50 can generate, as the basis for a reconstruction algorithm, a kernel for the object space distortion due to the dithering motion and the temporal high pass filtering. Alternatively, the image restorer can be supplied with an appropriate kernel.

The image restorer 50 then generates a reconstructed image signal 23 by convolving an inverse of the kernel with the filtered image signal 21. The reconstructed image signal represents the image signal without the distortions created by the dithering motion and with a reduced fixed pattern noise component. In addition, the fixed pattern noise component that remains in the reconstructed image signal 23 is effectively smoothed by the spatial low pass response of the convolution of the inverse kernel with the filtered image signal 21. Accordingly, the reconstructed image signal 23 is a restored observed image with a reduced and smoothed fixed pattern noise component.

Figure 2:
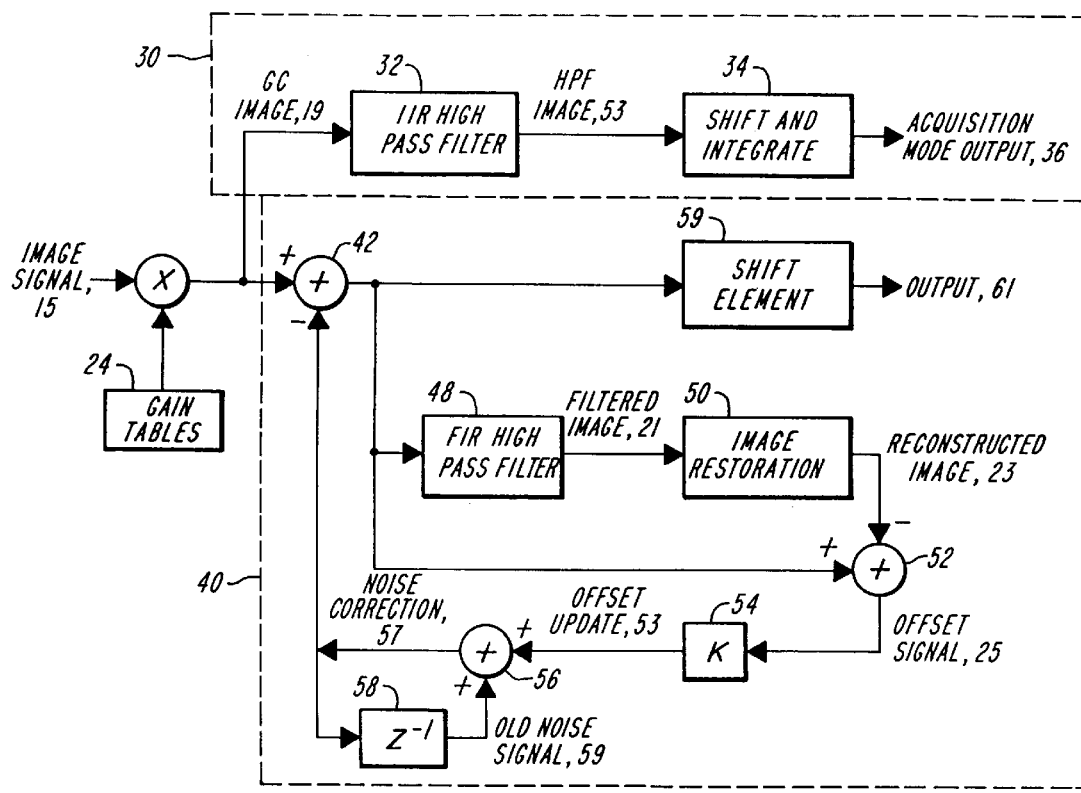
FIG. 2 is a detailed block diagram of the signal processor 20 from FIG. 1.

FIG. 2 illustrates another aspect of the signal processor 20 having the first multiplier 26, the gain table 24, an object acquisition subsystem 30, and an active offset update subsystem 40. The object acquisition subsystem 30 includes an Infinite Impulse Response high-pass filter 32 and a shift-and-integrate circuit 34. The active offset update subsystem 40 includes a first adder 42, an Finite Impulse Response high-pass filter 48, an image restorer 50, a second adder 52, a gain circuit 54, a third adder 56, a memory circuit 58, and a shift element 59.

The signal processor 20 receives a sequence of image signals 15 comprised of electrical signals generated by the individual detectors of the focal plane array 14 of FIG. 1. These signals are then multiplied by corresponding values from the factory preset gain tables 24 by the first multiplier 26. Each value in the factory preset gain table 24 represents that value by which the electrical signal from the corresponding detector must be multiplied to render the signals from each detector uniform when the focal plane array 14 is evenly illuminated. The resultant sequence of gain corrected images from the first multiplier 26 is output simultaneously as the GC Image Signal 19 to both the object acquisition subsystem 30 and the active offset update subsystem 40.

The object acquisition subsystem 30 provides a group of data processing elements used in acquiring the observed image. The object acquisition subsystem 30 is advantageous because it converges faster than the active offset update subsystem 40. The structure of the image acquisition subsystem 30 is ideal for correcting offset errors in an image consisting of point sources. However, because of its reliance on high-pass filtering means to remove fixed pattern noise, the object acquisition system 30 tends to remove low frequency details in an extended moving image.

The High Pass Filter 32 of the object acquisition subsystem 30 receives the GC image signal 19 and generates an HPF Image Signal 33. Typically, the high pass filter 32 is formed as an infinite impulse response high-pass filter. In addition, a separate IIR high-pass filter is preferably maintained for every detector element in the focal plane array 14. By passing only high frequency components of the signal, the high-pass filter 32 removes the static background from the sequence of GC Images 19.

The shift and integrate circuit 34 receives as input the HPF Image Signal 33. The shift and integrate circuit 34 removes the effect of the predictable dither motion from the sequence of input images and integrates the detector outputs corresponding to the same part of the image. The resulting output signal from the shift and integrate circuit 34 is an Acquisition Mode Output Signal 36. The output signal 36 is a non-dithered and time-averaged signal.

The active offset update subsystem 40 forms a reconstructed image using a high pass filter having a non-zero DC response. The high pass filter with a non-zero DC response generates a reconstructed image signal having a reduced fixed pattern noise component. To aid in completely eliminating the fixed pattern noise component, the subsystem 40 provides for an iterative estimation of the fixed pattern noise in the observed image. Each iteration estimates a new, more accurate reconstructed image signal 23 as the fixed pattern noise components converge out of the observed image. An output signal 61 is generated at the output of the shift element 59. The output signal 61 represents the current version of the observed image as viewed by the focal plane array.

For instance, the reconstructed image 23 includes the restored observed image and reduced and smoothed fixed pattern noise. The reconstructed image can be subtracted from a pre-filtered reference image 53 that contains the observed image and the uncorrected fixed pattern noise. The difference between the reconstructed image 23 and the reference image 53 represents the fixed pattern noise component. This calculated fixed pattern noise component can be stored and applied as a noise correction signal 57 to the next sequence of observed images supplied by the focal plane array 14. When this noise correction signal 57 is subtracted from the next observed image out of the focal plane array (i.e. the GC Image signal), the noise correction signal cancels the uncorrected fixed pattern noise in the next observed image. The shift element 59 then removes the effects of the dithering motion in the reference image 53 and generates the output signal 61.

Particularly, FIG. 2 illustrates the first adder 42 of the offset update subsystem 40 receiving as input the GC Image signal 19 and the noise correction signal 57. The first adder 42 subtracts from the GC Image signal 19 the noise correction signal 57. Thus, the first adder updates each successive observed image with the noise correction signal that was determined based upon the preceding observed image. The output of the adder is the reference image signal 53. The shift element 59 then generates the output signal 61 in response to the reference image signal 53 by spatially shifting the reference image signal 53 in a manner that removes the dither motion.

The temporal high pass filter 48, preferably a FIR filter, receives as an input the reference image signal 53. The temporal high pass filter generates an output signal identified as the filtered image signal 21. The reference image signal contains both an observed image component and a fixed pattern noise component. Because of the dithering process, the observed image component is converted into spatial variations that in turn are translated into temporal variations in the output of each detector in the focal plane array. In comparison, the fixed pattern noise component is predominately composed of non-varying temporal signals. Accordingly, the temporal high pass filter advantageously reduces the fixed pattern noise component in the reference image signal 53 while simultaneously passing the observed image component of the reference image signal 53 in a distorted, but restorable form. As was the case for the object acquisition subsystem 30, a separate FIR high-pass filter 48 is preferably maintained for every detector element of the focal plane array.

The image restorer 50 receives the filtered image signal 21 from the high pass filter 48, and the image restorer 50 generates the reconstructed signal 23 in response thereto. The image restorer reconstructs the observed image with a reduced fixed pattern noise component. The image restorer obtains these objectives by generating an inverse kernel based upon the known dither pattern and the known transfer functions for the high-pass filters 48. The inverse kernel, takes the form of a spatial low-pass filter. The image restorer convolves the generated inverse kernel with the received filtered image signal 21 to generate the reconstructed image signal 23. The reconstructed image signal 23 contains the image and a first offset error smaller than the original offset error of the focal plane array 14.

The image restorer 50 can operate on a filtered image signal in either the frequency or spatial domain to produce the reconstructed image 23. For instance, when the filtered image signal is a frequency signal, the image restorer 50 convolves an inverse fourier transform ("FFT$^{-1}$") of the filtered image signal with the inverse kernel and takes FFT$^{-1}$ of the convolved signal to form the reconstructed image signal 23. When the filtered image signal is a spatial signal, the image restorer 50 convolves the filtered image signal with the inverse kernel to form the reconstructed image signal 23.

A second adder 52 subtracts the reconstructed image signal 23 from the reference image signal 53 to form an Offset Update Signal 55. The Offset Update Signal is representative of the fixed pattern noise component found in the reference image signal 53.

A third adder 56 is operably coupled with the second adder 52 for receiving the Offset Update signal 55. The third adder also receives an Old Noise Signal 59 as an input. The third adder sums the offset update signal 55 and the old noise signal 59 to generate a Noise Correction Signal 57. The noise correction signal 57 represents an iterative combination of the current determination of the fixed pattern noise component and of the prior determinations of the fixed pattern noise component. The noise correction signal is output to the first summer 42 for updating the current GC Image signal 19 and is output to a memory circuit 58. The memory circuit stores the current noise correction signal 57 and outputs the previously calculated noise correction signal 57 as the old noise signal 59.

An optional feature of the invention is an offset estimate gain circuit 54. The gain circuit 54 is operably coupled between the second summer 52 and the third summer 56. In operation, the gain circuit receives the output signal of the second summer 52 and generates the offset update signal 55. The gain circuit modifies the effect that the current calculation of the fixed pattern noise component will have on the previously calculated value of the fixed pattern noise component, as stored in the memory element 58.

The gain circuit 54 proves particularly advantageous in reducing temporal noise levels that would otherwise propagate through the system 10. In particular, the gain circuit 54 aids in preventing temporal noise from completely passing through the reconstruction process and producing errors in the fixed pattern noise determination. Temporal noise errors can include random Shot noise added to the signal of any individual detector in the focal plane array 14. This random noise passes freely through the high pass filter 48 because it creates the appearance of an image change and is accordingly not attenuated. The use of the gain circuit 54 reduces the impact of this random temporal noise by reducing the amplitude of the offset update signal 55.

As this system is an estimator, the traditional tradeoff between estimator bandwidth and image integrity is available through the setting of the gain in the gain circuit 54. Modifying the gain value provides the ability to balance the tradeoff between estimator bandwidth and image integrity. A low gain reduces the impact of any errors introduced during the image reconstruction process, while a high gain decreases the time required for offset estimation to converge. The value of the gain in the gain circuit 54 may be a scalar factor, or the gain may instead be dynamically controlled through the application of Kalman filter approaches. For example, the value of the gain circuit can vary in order to achieve an optimal initial convergence of the fixed pattern noise. The gain can also be varied based upon temporal noise measurements in order to obtain an optimal trade-off between estimator band width and noise rejection.

Figure 12:
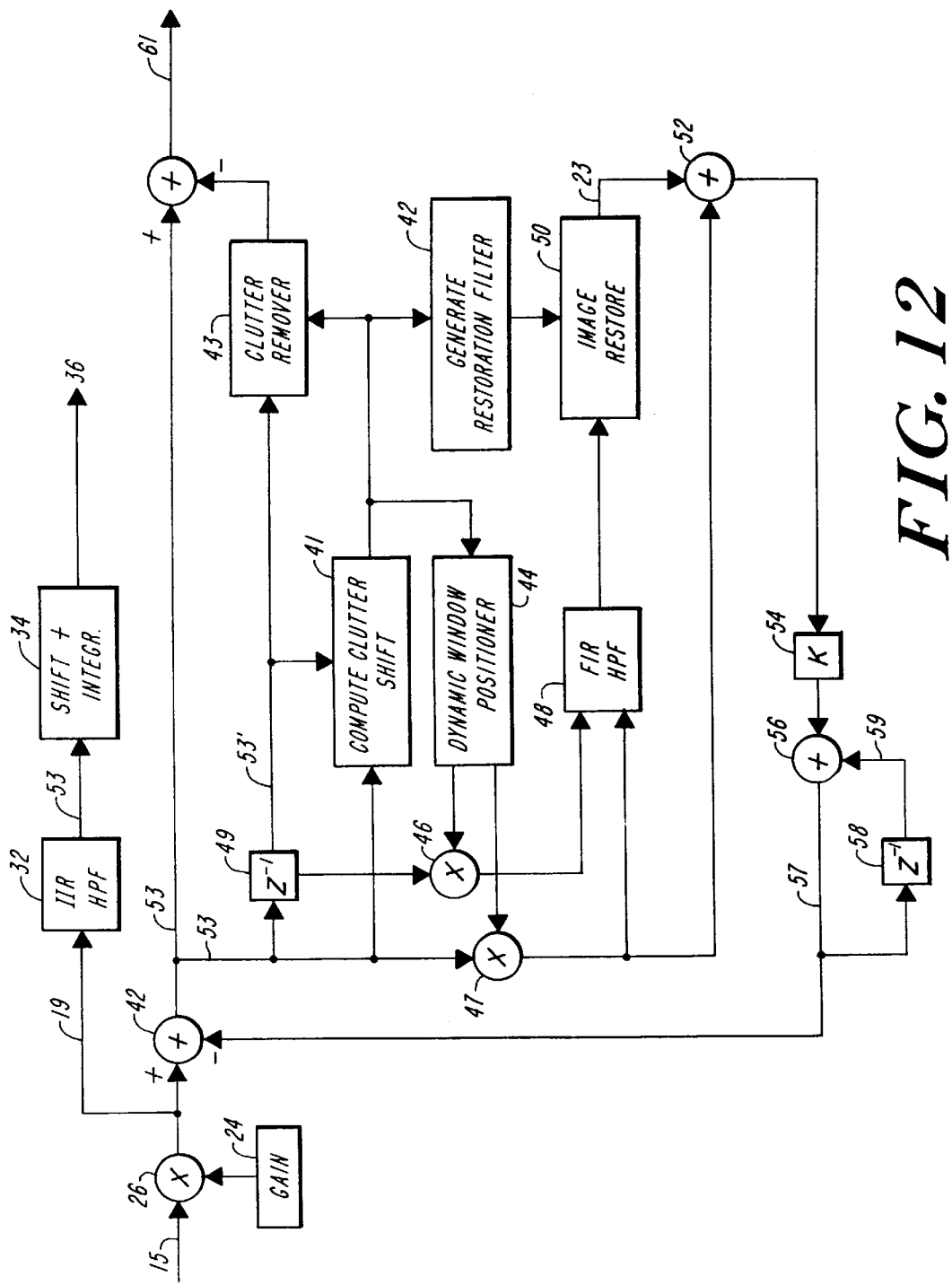
FIG. 12 is a detailed block diagram of the signal processor 20 from FIG. 1 with the addition of a means for measuring scene motion between image frames and deriving an image restoration filter therefrom.

In an alternative embodiment of the invention, the image restorer 50 does not know the dither pattern. For example, the dithering mechanism may be incapable of following a specified dithering cycle with adequate precision. The only difference in the apparatus and method of the invention under these circumstances is the inclusion of an adaptive restoration filter. Such a filter includes a means for performing scene-to-scene registration to measure the object space motion and to estimate a dither pattern from that motion. FIG. 12 illustrates a signal processor 20 modified to use scene-to-scene registration to dynamically estimate the dither pattern based on measurement of object space motion.

Referring to FIG. 12, the modified signal processor includes a clutter shift computer 41 having as inputs the reference image signal 53 and a reference image signal from a previous image frame 53' obtained by passing the reference image signal 53 through a second memory circuit 49.

The clutter shift computer 41 derives the dither pattern by shifting the reference image signal 53 relative to the previous image frame 53' by an integer number of pixels. For each shift, the clutter shift computer 41 calculates the correlation between the shifted reference image signal and the previous image frame. The shift resulting in the largest such correlation between the reference image signal 53 and the previous image frame 53' approximates that section of the dither pattern having the reference image signal and the previous image frame as endpoints. This procedure is then repeated, at the sub-pixel level, by shifting a portion of the reference image signal relative to a portion of the previous image frame corresponding to the same relative object space region. The optimal sub-pixel shift can be determined by stabdard interpolation techniques.

The calculation of correlation between two shifted elements need not be performed over the entire image frame.

Instead, the clutter shift computer 41 can select one or more portions of the reference image signal 53 and one or more corresponding portions from the previous image frame 53' and use those portions to calculate the correlation between the two frames.

The clutter shift computer 41 passes the measured sub-pixel shift to the restoration filter computer 42. The restoration filter computer 42 uses this information to derive an image restoration filter corresponding to the measured motion. This is then passed to the image restorer 50. The image restorer then generates the reconstructed image signal 23 in a manner already described. The application of this derived restoration filter restores the object space scene and smears fixed pattern noise in a manner similar to the supplied restoration filter discussed in connection with FIG. 2.

The foregoing method is particularly important where the object space scene moves independently of the sensor's known line of sight. If the sensor's line of sight were to be used, there would be significant errors introduced into the offset estimate.

There may be cases in which additional dithered motion must be added. For example, where scene motion is random in only one dimension, dither along the camera's line of sight is required to ensure correction in two dimensions. Another example is the case of an object is being tracked. Such an object would appear stationary against a cluttered background. Absent this added dither to induce motion of the object along the camera's line of sight, the tracked object would be treated like fixed pattern noise and removed. Note that if a voter, as described below, is used, it also becomes necessary to ensure that the added dither move the tracked object by three or more pixels to prevent the tracked object from appearing twice in the same location. Otherwise, the voter would remove the tracked object from the scene.

The clutter shift computer 41 optionally passes the derived dither pattern to a clutter remover 43 which uses this information to shift the previous image frame 53' before subtracting it from the reference image signal 53. This operation results in removal of clutter from the output signal 61.

The clutter shift computer 41 also passes the derived dither pattern to a dynamic window positioner 44 which uses it to calculate the size and position of a window to be used for windowing both the image reference signal 53 and the previous image frame 53'. For example, if the clutter shift computer 41 detects that a two pixel horizontal shift in background has occurred, the dynamic window positioner 44 generates a window which, when multiplied by the reference image signal 53 or the previous image frame 53, zeroes all data within two columns of the left and right edges of the reference image. For dither patterns in which the shift is smaller than one pixel, the dynamic window positioner 44 uses bilinear interpolation to determine shape the transition between the edges of the image and the interior of the image.

Windowing is accomplished by directing the output of the dynamic window positioner 44 to a second multiplier 47, having an input connected to the reference image signal 53, and to a third multiplier 46, having an input connected to the previous image frame 53'. The output of the second multiplier 47, representing a windowed version of the reference image signal 53, and the output of the third multiplier 46, representing a windowed version of the previous image frame 53', are both passed to the temporal high pass filter 48. The foregoing windowing step results in the removal of most edge effects and thereby avoid errors in subsequent image restoration steps relying on FFTs.

Figure 3:
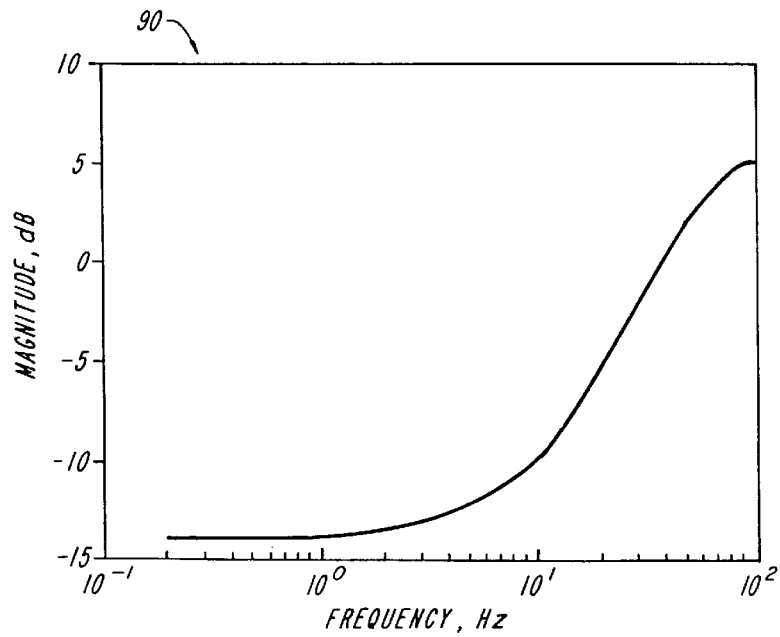
FIG. 3 shows an exemplary filter transfer function for the high-pass filter 48 shown in FIG. 2.

FIG. 3 illustrates an example of a frequency response 40 for the high-pass filter 48 used in the system 10. Two particularly important parameters of the filter 48 are the cuton frequency and the DC response.

The selection of the filter cuton frequency is dependent on temporal noise characteristics for the particular application. A minimum frequency is determinable based on the $1/f$ knee frequency of the focal plane array 14. A lower cut-on frequency results in a longer settling time for the high-pass filter 48. Preferably, the filter design provides for a filter that settles prior to acquiring the next image frame for processing.

The DC response of the filter is also critical to the operation of the system. The DC response must be non-zero in order to fully reconstruct the observed image using a kernel. There also exists a trade-off between convergence performance and temporal noise induced errors that results from the selected DC response of the filter. Small values of DC response drive the overall temporal noise gain of the image restoration process and increase convergence performance. Large values of DC response reduce temporal noise induced errors.

Figure 4:
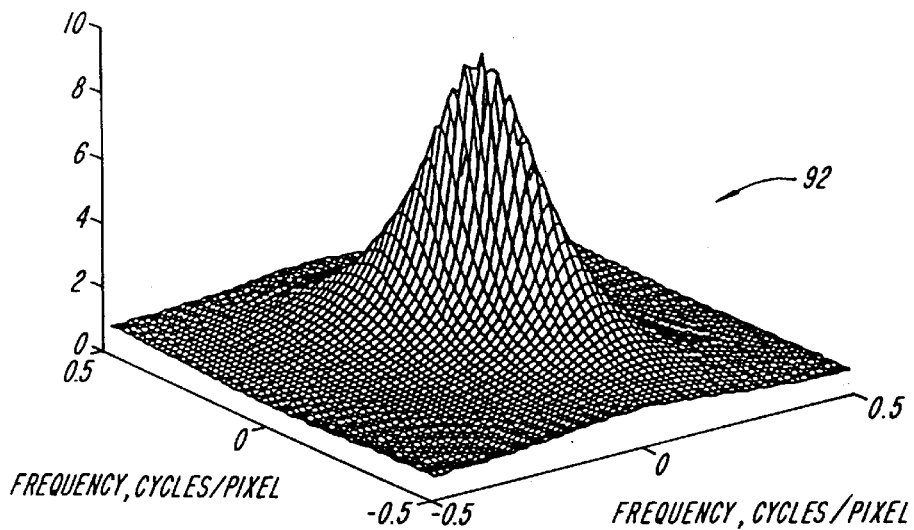
FIG. 4 shows an inverse kernel used by the image restorer 50 of FIG. 2.

FIG. 4 illustrates an example of a restoration filter 92 employed by the image restorer 50 to form the reconstructed image signal 23. The restoration filter shown can completely recover the object space image from the filtered image signal 21 input to the image restorer 50. The reconstructed image signal 23 is generated by convolving the restoration filter 92 with the filtered image signal 21.

The restoration filter 92 for the observed image may be derived by computing the two dimensional fourier transform of a kernel and inverting each element of the resultant complex frequency domain representation. The kernel is determined based upon the image dither pattern and the characteristics of the temporal high pass filter 48. Since the kernel has a spatially high pass response and remains non-zero over all frequencies, the restoration filter 92 has a low pass response and remains finite. The restoration filter 92 completely recovers the object space image and smoothes the fixed pattern noise that passes through the high pass filter.

Figure 5:
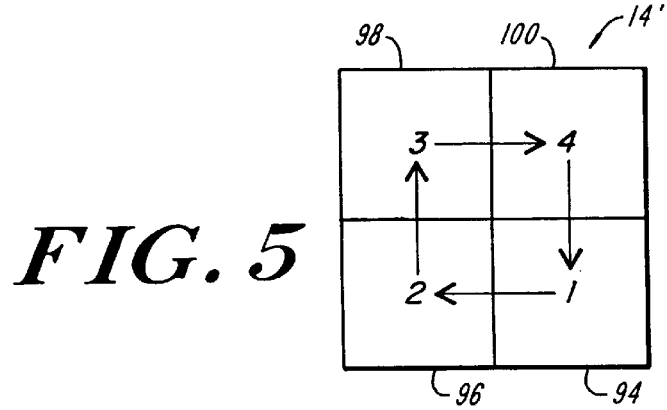
FIG. 5 is an example of a continuous dither cycle generated by the dither mechanism 18 in FIG. 1.

FIG. 5 shows a representative four point dither motion across a focal plane array 14'. The focal plane array 14' includes four detectors labeled 94, 96, 98 and 100. The dithering motion of an image point proceeds from detector 94, to detector 96, to detector 98, to detector 100, and back to detector 94. The dithering motion can be a step-stare motion where the scanning mechanism instantaneously steps from the center of one detector to the center of another detector. Alternatively, the dithering motion can be a continuous motion across the detectors. The step-stare dithering motion is typically subject to errors if the scanning mechanism fails to center the image point accurately over the center of each detector in the focal plane array 14'. The continuous dithering motion, in comparison, can be subjected to errors resulting from the continuos motion of the observed image over the focal plane array 14'.

Figure 6:
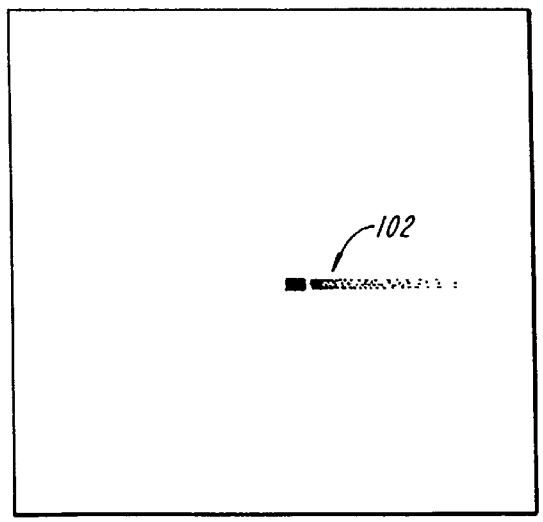
FIG. 6 illustrates a "tail" created in the output image due to a continuous dither cycle typified by that shown in FIG. 5.

FIG. 6 illustrates a potential error that can occur during continuous dithering. In particular, FIG. 6 shows a "tail" 102 created in the output image due to the continuous dither scan. Ideally, the point source illuminates only one detector per sample. However, when the sampling time of the focal plane array 14' during a continues dithering pattern causes the illumination of several nearby detectors in a given sample, the tail 102 can result. The illumination of several nearby detectors causes the nearby detectors to be corrected for fixed pattern noise errors. These unintended error corrections to the nearby detectors creates the tail 102.

Tail formation can be avoided by using a "stop-and-stare" dithering mechanism in which the image is in motion only between frame samples. However, an apparatus having means for stop-and-stare dithering imposes mechanical complexity as well as constraints in dithering speed arising from mechanical inertia. Tail formation errors can also be reduced using a voter 80, as described with reference to FIG. 7.

Image wrapping is another form of image distortion. Image wrapping arises when an image is so close to the edge of the focal plane array that it moves on and off the array during the dither cycle. After image restoration, the image is "wrapped" to the other side of the focal plane array, thereby introducing error in the update response. It is known to one skilled in the art that a restoration process conducted in the frequency domain inherently assumes that the image is periodic. Therefore, the restoration process expects the image to fall off one edge and onto the opposite edge. This assumption introduces error into the system. Wrapping errors can be reduced using the voter 80, as described with reference to FIG. 7.

Figure 7:
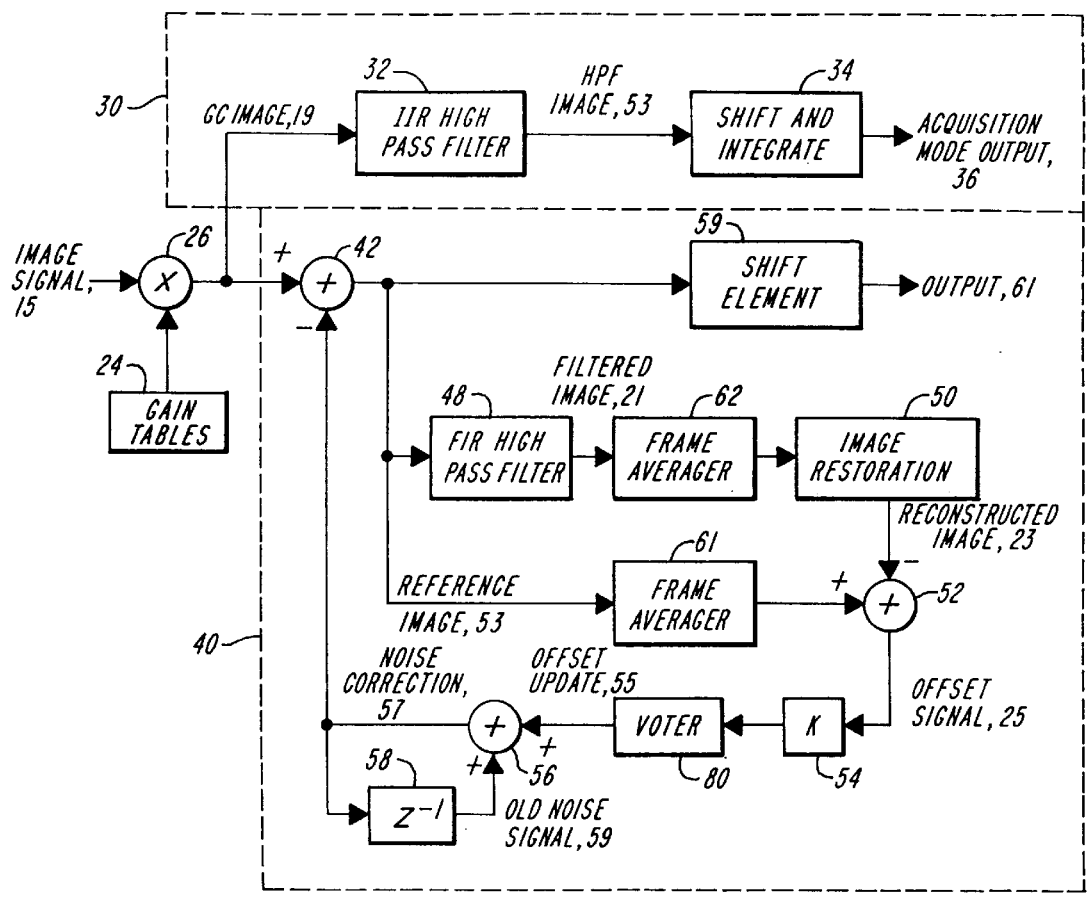
FIG. 7 is a detailed block diagram of the signal processor 20 from FIG. 1 according to another aspect of the invention.

Second FIG. 7 illustrates another aspect of the signal processor 20 having the voter 80, a first frame averager 62, and a second frame averager 61. The voter 80 is operably positioned for updating the noise correction signal 57 before the noise correction signal is input to the first adder 42. For instance, the voter 80 can be operably coupled between the input of the third adder 56 and the output of the gain circuit 54. The first frame averager 62 is coupled for operably receiving and averaging the filtered image signal 21, the second frame averager 61 is coupled for operably receiving and averaging the preference image signal 53. Both the first and the second frame averagers are optional features of the signal processor 20.

Figure 8:
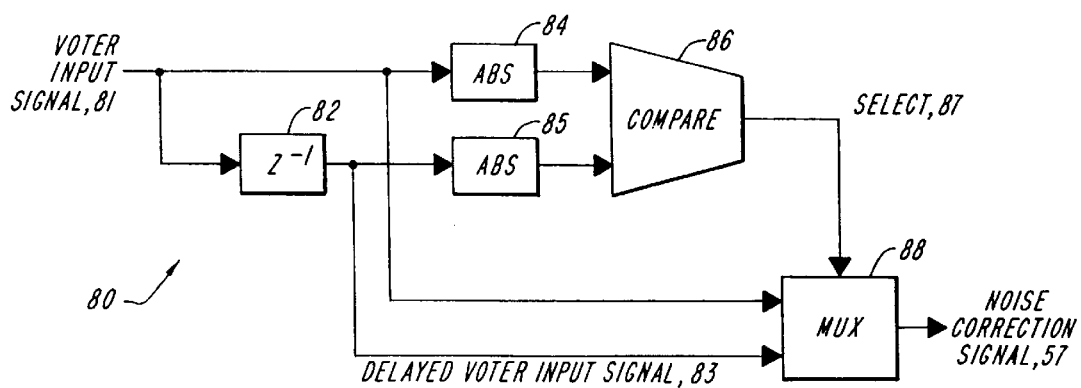
FIG. 8 illustrates an embodiment of the voter 80 shown in FIG. 7.

FIG. 8 illustrates further details of the voter 80 having a delay element 82, a first absolute value processor 84, a second absolute value processor 85, a comparator 86, and a multiplexer 88. The voter 80 reduces tail formation errors and wrapping errors by refraining from processing every scan of the focal plane array. In particular, the voter compares successive input signals and only transmits the signal having the smaller absolute value.

As shown in FIG. 8, the voter 80 receives a voter input signal 81 from the gain circuit 54. The voter input signal 81 is routed to the delay element 82 and to the first absolute value processor 84. The output of the delay element 82, a delayed voter input signal 83, is routed to the second absolute value processor 85. Each of the first and second absolute value processors 84, 85 determine the amplitudes of the incoming signals and pass the resultant amplitudes to the comparator 86. Thus, the comparator receives signals representing the amplitudes of the voter input signal 81 and the delayed voter input signal 83.

The comparator compares the two received signals and generates a select signal 87 in response thereto. The select signal 87 is coupled to the multiplexer 88, and the select signal directs the routing of the multiplexer. The multiplexer 88 receives the voter input signal 81 and the delayed voter input signal 83.

In operation, if the absolute value of the voter input signal 81 is less than the absolute value of the delayed voter input signal 83, then the comparator 86 instructs the multiplexer 88 to transmit the voter input signal 81, otherwise the comparator instructs the multiplexer to transmit the delayed voter input signal 83. Accordingly, the voter 80 compares current voter input signal with delayed voter input signal, and transmits the signal having the smallest absolute amplitude. The voter chooses the smaller of two successive voter input signals separated in time by the delay element 82.

Wrap around errors are reduced by the voter 20. Given a first sample in which an image has wrapped around to the other side of the focal plane array and a second sample in which it has not, it is likely that the necessary offset will be larger in the first sample than in the second sample. Since the voter chooses the sample requiring the smaller offset error, the first sample is rejected and the wrap around error is reduced.

Tails are also reduced by the voter 20. For example, when a tail exists different detectors will generate a tail tracing in a different direction as the observed image is dithered across the focal plane array. With the tail going in different directions, the system 10 experiences an artifact having a zero magnitude in one direction and having a non-zero magnitude in another direction. When these artifacts are compared in the voter 20, the voter chooses the noise correction signal having the smaller artifact, thereby reducing the overall error produced by the tails.

With further reference to FIG. 7, the first frame averager 62 is operably coupled to the output of the high pass filter 48 and the second frame averager 61 is operably coupled to the input of the second adder 52. The frame averagers 62, 61 average the output of signals over successive frame samples to reduce temporal noise. Frame averaging reduces temporal noise by the square root of the number of frames averaged. Temporal noise typically is not constant, but instead varies over time. Accordingly, to the extent that a particular detector experiences temporal noise during one sample but not the other, forming the average value of the two signals reduces the overall level of temporal noise.

Figure 9:
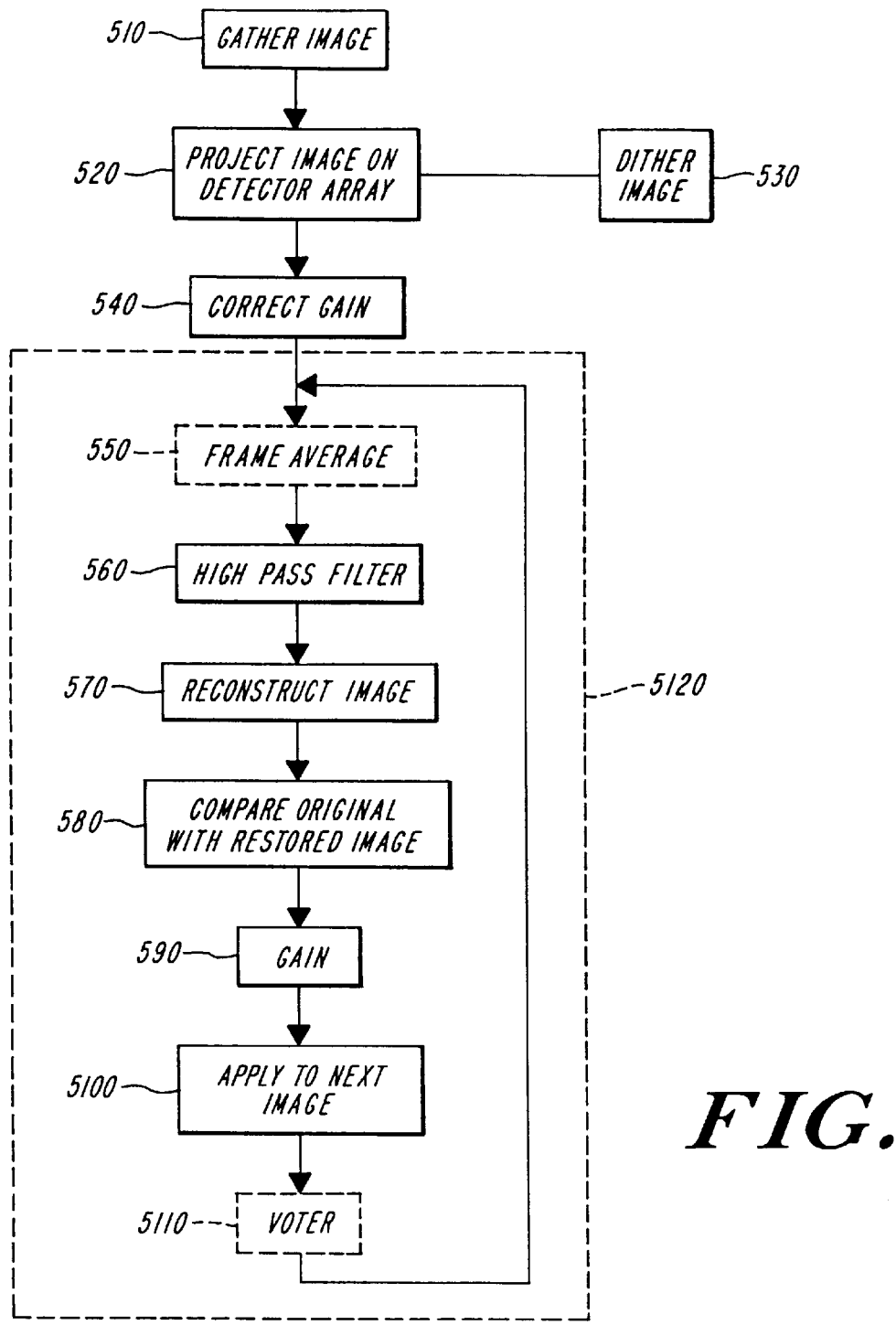
FIG. 9 is a flowchart illustrating the active offset compensation method of the invention.

FIG. 9 is a flow chart of the active offset compensation method of the present invention. The method includes the steps of gathering an image with system optics s10, projecting the image on a focal plane array s20, correcting the image s40 for gain errors, and correcting the image for offset errors s120. The step of dithering the image s30 occurs concurrently with the projection step s20.

The step of correcting the image for offset errors s120 includes the steps of filtering the gain corrected signal with the high-pass filter s60, reconstructing the image from the output of the high-pass filter s70, comparing the original and reconstructed images to determine the offset s80, passing the offset through a gain circuit s90, and adding the resultant scaled offset update to the previously determined offset s100.

In one aspect of the invention, the offset updating step s120 includes a frame averaging step s50 (shown in dashes) performed between the gain correction step s40 and the high-pass filtering step s60.

In another aspect of the invention, the offset updating step s120 includes a voting step s110 (shown in dashes) performed before the step of applying the scaled offset update to the next image s100.

Figure 10:
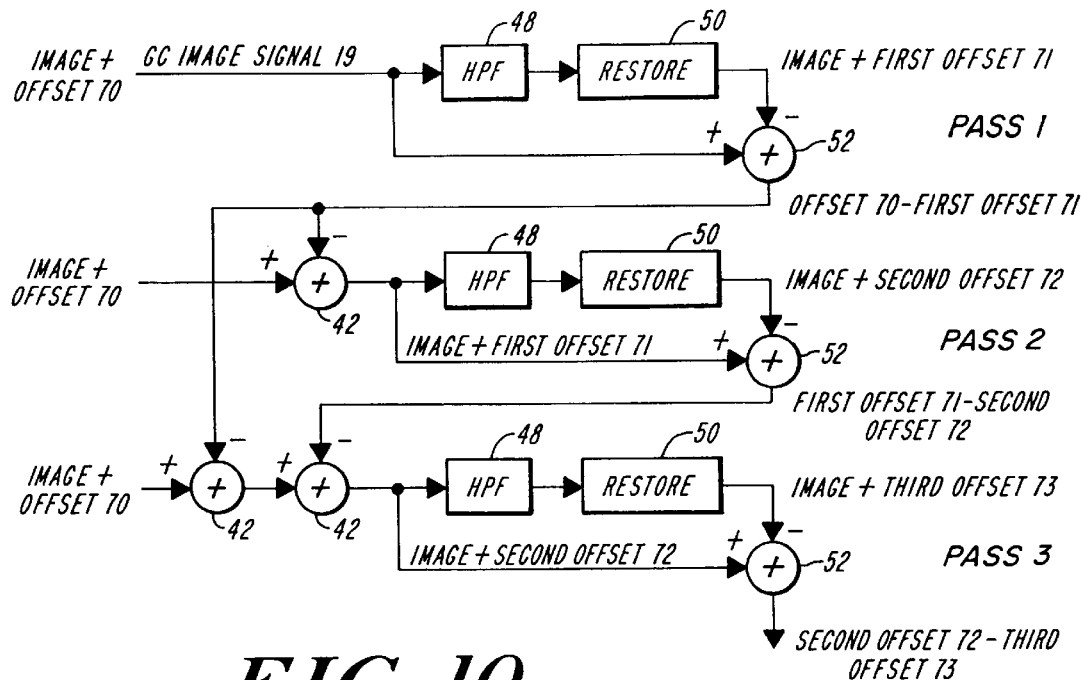
FIG. 10 the recursive nature of the method illustrated in FIG. 9.

FIG. 10 displays the iterative nature of the active offset compensation method of the present invention. The gain corrected image signal 19 input to the high pass filter 48 and to the adder 52, includes the image signal and an actual offset error 70. In the first iteration, the image restorer 50 generates a reconstructed image signal 23 having an image signal and a first offset estimate 71. A difference between the first offset estimate 71 and the actual offset error 70 is generated at the output of the adder 52. During all succeeding iterations the difference between the actual offset error 70 and the first offset estimate 71 is applied to the subsequent GC image signals 19 at the adder 42.

In the second iteration, the image restorer 50 generates a second offset estimate 72 of the actual offset error 70. A difference between this second estimate of the offset error 72 and the first estimate of the offset error 71 is generated at the output of the adder 52. This difference can then be subtracted, by the first adder 42, from the gain corrected image signal 19.

In the third iteration, the GC image signal 19 is modified by the adder 42 based upon previous iterations. In particular, the output of adder 42=Image Signal+Actual Offset 70−Actual Offset 70+First Offset Estimate 71−First Offset Estimate 71+Second Offset Estimate 72=Image Signal+Second Offset Estimate 72.

It is apparent that with each succeeding iteration, the input to the high-pass filter 48 incorporates the accumulated corrections from all previous iterations, and that as a result, the offset error converges to a minimum.

Figure 11:
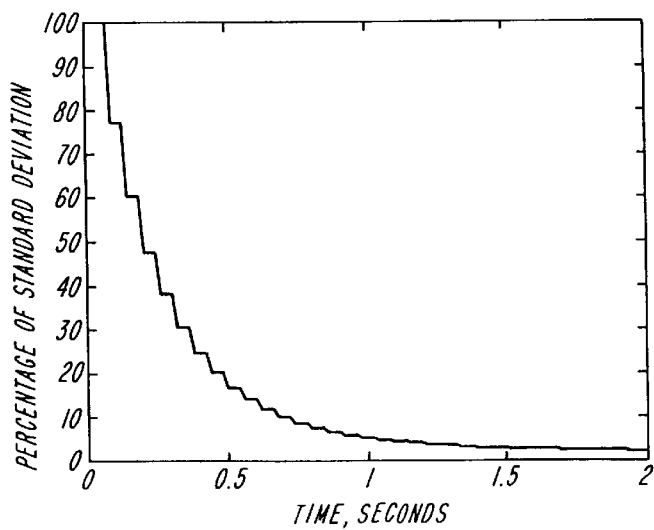
FIG. 11 shows the reduction in fixed pattern noise as the number of iterations of the FIG. 9 method increases.

FIG. 11 is a graph illustrating the reduction in the standard deviation of the fixed pattern noise as the number of iterations increases. The graph shows that the invention rapidly determines the level of fixed pattern noise, and that the greater the number of iterations the less the determination of the fixed pattern noise changes.

It will thus be seen that the invention efficiently attains the objects set forth above. Since certain changes may be made in the above constructions without departing from the scope of the invention, it is intended that all matter contained in the above description or shown in the accompanying drawings be interpreted as illustrative and not in a limiting sense.

Having described the invention, what is claimed as new and secured by Letters Patent is:

1. Apparatus for reducing fixed pattern noise in an image observed by an array of detectors, said apparatus comprising
 a plurality of image-responsive detectors, each said detector producing an image signal responsive to the portion of an observed image incident on said detector, thereby creating a set of image signals,
 dithering means for scanning said observed image across said detectors in a dithering cycle,
 temporal high-pass filtering means having a non-zero DC response for generating a set of filtered image signals each of which corresponds to one of said image signals, each of said filtered image signals having an attenuated low frequency component, and
 image restoration means for generating a reconstructed image based on said set of filtered image signals, wherein said reconstructed image corresponds to said observed image having reduced fixed pattern noise.

2. Apparatus according to claim 1 wherein said plurality of image-responsive detectors is a two-dimensional array of infrared detectors.

3. Apparatus according to claim 1 wherein said dithering means comprises means for repeatedly moving said detectors relative to the observed image.

4. Apparatus according to claim 3, wherein said means for moving said detectors is a motorized gimbal for changing the angular position of said detectors.

5. Apparatus according to claim 1 wherein said dithering means comprises means for repeatedly moving the observed image relative to said detectors.

6. Apparatus according to claim 5, wherein said means for moving the observed image is a steerable mirror in the optical path of said detectors.

7. Apparatus according to claim 6, wherein said steerable mirror is a galvo mirror.

8. Apparatus according to claim 6, wherein said steerable mirror is a piezoelectric actuated mirror.

9. Apparatus according to claim 1, wherein said dithering means includes a base supporting said plurality of detectors, said base having an inherent jitter motion.

10. Apparatus according to claim 1, wherein said temporal high-pass filtering means includes a finite impulse response filter.

11. Apparatus according to claim 1, wherein said temporal high-pass filtering means includes an infinite impulse response filter.

12. Apparatus according to claim 1, further comprising a shifting means for periodically sampling each of said image signals at a period corresponding to an integer multiple of said dithering cycle, said shifting means forming an output signal representing the observed image with reduced fixed pattern noise.

13. Apparatus according to claim 3 wherein said image, filtered image restoration means further includes convolving means for convolving said signals with an inverse kernel of said temporal high-pass filtering means.

14. Apparatus according to claim 1, further comprising correcting means for iteratively determining the fixed pattern noise in said observed image as a function of said image signal, said reconstructed image, and an old noise signal representative of a previously determined fixed pattern noise in a previously observed image.

15. Apparatus according to claim 14, wherein said correcting means comprises
 differencing means for generating an offset update signal corresponding to the difference between said reconstructed image and said image signal, and
 updating means for generating a noise correction signal corresponding to the sum of said offset update signal and said old noise signal.

16. Apparatus according to claim 15, wherein said updating means includes memory means for storing and retrieving said old noise signal, and an adder coupled with said memory means for calculating the sum of said offset update signal and said old noise signal.

17. Apparatus according to claim 15, wherein said differencing means further includes an offset estimate gain circuit for modifying said offset update signal.

18. Apparatus according to claim 17, wherein said offset estimate gain circuit varies over time to optimize reduction of fixed pattern noise.

19. Apparatus according to claim 17, wherein said offset estimate gain circuit is a scalar factor.

20. Apparatus according to claim 15, further comprising voter means for reducing error in said noise correction signal.

21. Apparatus according to claim 1, further comprising frame averaging means for reducing temporal noise.

22. Apparatus according to claim 1, further comprising an object acquisition means for generating an acquisition signal that identifies the presence of said observed image.

23. Apparatus according to claim 22, including
 a temporal high-pass filter for generating a first set of signals having an attenuated low frequency component, said first set of signals corresponding to said image signals,
 a sampler for periodically sampling said first set of signals at a period corresponding to an integer multiple of said dithering cycle, and an averager for generating said acquisition signal, said acquisition signal corresponding to the average of said sampled first set of signals.

24. A method for reducing fixed pattern noise in an observed image, said method comprising the steps of:
dithering said observed image across a plurality of image-responsive detectors in a dithering cycle,
forming a set of image signals corresponding to a portion of said observed image incident on said detectors,
filtering said image signals with a temporal high-pass filter having a non-zero DC response to generate a set of filtered image signals corresponding to said image signals, each of said filtered image signals having an attenuated low frequency component, and
generating a set of reconstructed signals as a function of said filtered image signals, wherein said reconstructed signals correspond to said observed image having reduced fixed pattern noise.

25. A method according to claim 24, wherein said dithering step includes repeatedly moving said detectors relative to said observed image.

26. A method according to claim 25, wherein said dithering step further includes moving a gimbal mounting said detectors, thereby changing the angular position of said detectors.

27. A method according to claim 24, wherein said dithering step includes repeatedly changing the optical path of said detectors with a steerable mirror.

28. A method according to claim 24, wherein said dithering cycle includes a staring interval during which said observed image is stationary relative to said detectors.

29. A method according to claim 24, wherein said observed image is continuously dithered throughout said dithering cycle.

30. A method according to claim 24, wherein four adjacent detectors are traversed once during said dithering cycle.

31. A method according to claim 24, wherein said step of forming image signals includes the step of multiplying said image signals by a gain correction factor.

32. A method according to claim 24, wherein said filtering step further includes independently filtering each detector with a separate temporal high-pass filter.

33. A method according to claim 24, further includes the step of:
periodically sampling each of said image signals at a period corresponding to an integer multiple of said dithering cycle, such that an output signal representing the observed image is formed.

34. A method according to claim 24, wherein said generating step further includes the step of convolving said filtered image signals with an inverse kernel of said temporal high-pass filter.

35. A method according to claim 34, further including the step of deriving said inverse kernel based on the line of sight motion of said detectors.

36. A method according to claim 24, further comprising the step of iteratively correcting the fixed pattern noise in said observed image as a function of said image signal, said reconstructed image, and an old noise signal representative of a previously determined fixed pattern noise in a previously observed image.

37. A method according to claim 36, wherein said correcting step comprises the steps of:
generating an offset update signal corresponding to the difference between said reconstructed image and said image signal,
forming a noise correction signal corresponding to sum of said generated offset update signal and said old noise signal, and
offsetting said image signal by said noise correction signal.

38. A method according to claim 37, wherein said correcting step further comprises the step of modifying said offset update signal by a gain value.

39. A method according to claim 38, wherein said modifying step includes varying said gain value over time.

40. A method according to claim 37, further comprising the step of reducing errors in said noise correction signal by selectively processing said noise correction signal.

41. A method according to claim 40, wherein said error reducing step includes comparing the absolute value of successive noise correction signals and selectively transmitting a noise correction signal having a smaller absolute value.

42. A method according to claim 24 further comprising the step of averaging signals over successive frames to reduce temporal noise.

43. Apparatus according to claim 1 further comprising means for deriving said dithering cycle based on a difference between a first observed image observed by said array of detectors and a second observed image observed by said array of detectors at a time subsequent to said first observed image.

44. Apparatus according to claim 43 wherein said means for deriving said dithering cycle comprises
means for shifting said second observed image relative to said first observed image, thereby creating a shifted second observed image; and
means for computing a correlation between said first observed image and said shifted second observed image.

45. Apparatus for reducing fixed pattern noise in an image observed by an array of detectors, said apparatus comprising
a plurality of image-responsive detectors, each said detector producing an image signal responsive to the portion of an observed image incident on said detector, thereby creating a set of image signals,
dithering means for scanning said observed image across said detectors in a dithering cycle thereby forming a first observed image observed by said array of detectors and a second observed image observed by said array of detectors at a time subsequent to said first observed image,
means for deriving said dithering cycle, said means including
means for shifting said second observed image relative to said first observed image, thereby creating a shifted second observed image, and
means for computing a correlation between said first observed image and said shifted second observed image,
temporal high-pass filtering means having a non-zero DC response for generating a set of filtered image signals each of which corresponds to one of said image signals, each of said filtered image signals having an attenuated low frequency component, and
image restoration means for generating a reconstructed image based on said set of filtered image signals, wherein said reconstructed image corresponds to said observed image having reduced fixed pattern noise.

46. A method for reducing fixed pattern noise in an observed image, said method comprising the steps of:

dithering said observed image across a plurality of image-responsive detectors in a dithering cycle, thereby forming a first observed image observed by said array of detectors and a second observed image observed by said array of detectors at a time subsequent to said first observed image, deriving said dithering cycle by shifting said second observed image relative to said first observed image, thereby creating a shifted second observed image, and computing a correlation between said first observed image and said shifted second observed image, forming a set of image signals corresponding to a portion of said observed image incident on said detectors, filtering said image signals with a temporal high-pass filter having a non-zero DC response to generate a set of filtered image signals corresponding to said image signals, each of said filtered image signals having an attenuated low frequency component, and generating a set of reconstructed signals as a function of said filtered image signals, wherein said reconstructed signals correspond to said observed image having reduced fixed pattern noise.

* * * * *